Oct. 22, 1935.     S. LEWIS     2,018,271
ARTICLE AND NONSLIP SUPPORTING MEANS THEREFOR AND
METHOD OF PRODUCING AND ASSEMBLING THE SAME
Filed April 12, 1935

INVENTOR.
Samuel Lewis
BY
Clark & Ott
ATTORNEYS

Patented Oct. 22, 1935

2,018,271

UNITED STATES PATENT OFFICE 2,018,271

ARTICLE AND NONSLIP SUPPORTING MEANS THEREFOR AND METHOD OF PRODUCING AND ASSEMBLING THE SAME

Samuel Lewis, Woodmere, N. Y.

Application April 12, 1935, Serial No. 16,012

2 Claims. (Cl. 29—84)

This invention relates to ash trays or similar articles which are adapted to rest upon a table or other supporting surface and comprehends a non-slip supporting means therefor and a method of producing and assembling said means with the article.

The invention broadly provides a non-slip resilient cushioning and supporting element for articles of the indicated character comprising a strip of sponge rubber having a cellular body structure formed on its opposite sides with a skin and having a cut surface at its lower edge exposing the cellular body structure, which surface forms a suction gripping face for contact with a supporting surface.

The invention refers more particularly to an article of the indicated character having a continuous groove in the bottom thereof with a resilient non-slip supporting element secured therein and protruding in edgewise relation therefrom and which element is formed of sponge rubber having the cellular structure thereof opening through the lower edge to provide a suction gripping surface for contact with the support.

The invention further comprehends a method of producing a non-slip supporting element and assembling the same with an article, which consists in forming a continuous groove in the lower surface of the article, cutting a strip from a sheet of sponge material so that the opposite edges, produced by the cutting, expose the cellular structure of the material and then emplacing and securing the strip in the groove with a portion thereof protruding therefrom and having one of the cut edges disposed parallel to and below the bottom of the article to form a suction gripping supporting surface for the article.

The method also consists in disposing the opposite cut edge of the strip in contact with the upper wall of the groove so as to obtain an effective bonding of the same therewith by means of an adhesive.

With the above enumerated and other objects in view, reference is now made to the following specification and accompanying drawing which discloses one form thereof, while the appended claims cover variations and modifications thereof which fall within the scope of the invention.

Figure 1:
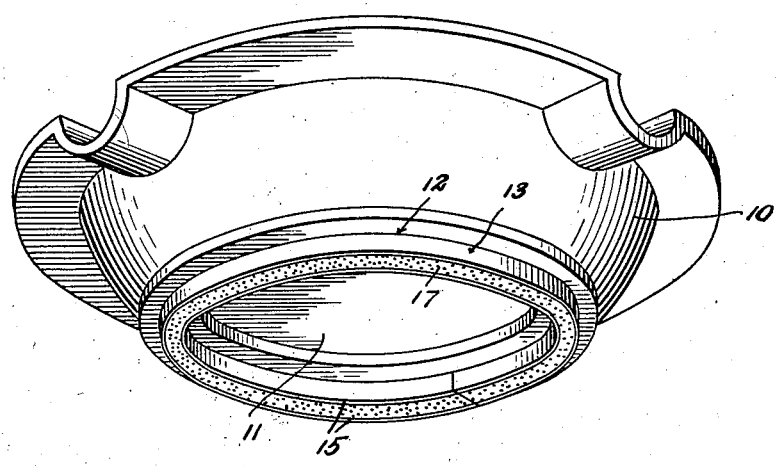
Fig. 1 is a perspective view of an ash tray embodying the non-slip supporting means constructed in accordance with the invention.
Figure 2:
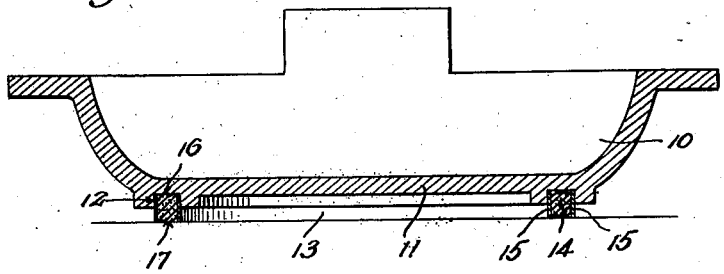
Fig. 2 is a vertical sectional view therethrough.

Referring to the drawing by characters of reference, 10 designates an ash tray or equivalent article which is adapted to rest upon a table or other supporting surface and which includes a bottom wall 11 formed with a continuous groove 12 opening through its lower surface.

A non-slip resilient cushioning and supporting element, designated generally by the reference character 13, is fitted within the groove and protrudes therefrom. The element 13 preferably consists of a strip of sponge rubber having a cellular body structure 14, the opposite sides of which are provided with a skin 15 which is disposed parallel to the side walls of the groove with upper and lower cut surfaces 16 and 17 exposing the cut cellular structure. The cut cells forming the lower surface 17 of the element 13, provide a suction gripping face for contact with the supporting surface which functions to minimize slipping with reference to the supporting surface, while the yieldable resilient character of the material forms a cushion to prevent scratching or marring of the supporting surface. The skin 15 in addition to stabilizing the supporting element and strengthening the structure thereof, facilitates the emplacement of the strip in the groove. The strip is preferably secured in the groove by an adhesive and the upper cut surface 16 of the cellular body provides means for more effectively bonding and keying the strip to the upper wall of the groove.

Figure 3:
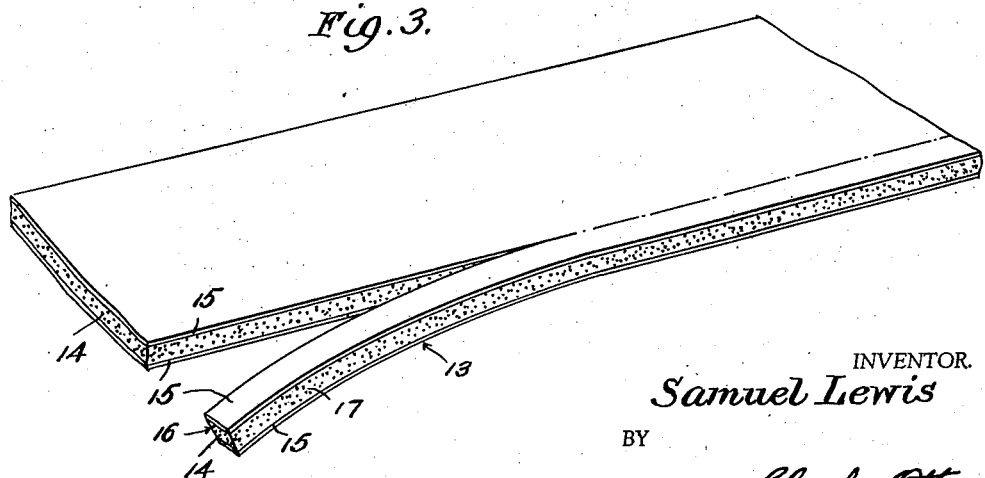
Fig. 3 is a perspective view of a sheet of sponge rubber illustrating the manner in which the strips are cut therefrom to form the non-slip supporting element.

The invention also provides a method of producing the non-slip supporting element and of assembling the same with the article, which method of production consists in cutting the strip 13 from a sheet of sponge rubber as shown in Fig. 3, the cut extending parallel to one edge of the sheet and perpendicular to the plane of the skin 15 to provide the opposite cut surfaces 16 and 17 of the cellular body 14.

The method of assembling the strip 13 with the article 10 consists in forming the groove 12 in the lower surface of the bottom wall 11, which groove corresponds in width to the width of the strip and which is of a lesser depth than the depth of the strip, then emplacing the strip in the groove with the skin 15 parallel to the sides of the groove after applying an adhesive to the upper cut surface 16 and to the sides of the strip and walls of the groove.

What is claimed is:

1. An article adapted to rest upon a supporting structure, including a bottom wall having a groove and a resilient non-slip supporting element comprising a strip of sponge rubber having a cellular body structure formed with a surface skin on opposite upright walls thereof and cut surfaces on the upper and lower walls thereof exposing the cellular body structure, said strip being secured within said groove with the surface skin adhesively bonded to the side walls thereof and with the strip protruding in edgewise relation from the groove with the lower cut surface providing a suction gripping face for contact with a supporting surface.

2. The method of producing a non-slip supporting element and assembling the same with an article consisting in forming a groove in the lower surface of the article, cutting a strip from a sheet of sponge rubber having a surface skin on its opposite sides, then emplacing and securing the strip in the groove with the skin surface disposed parallel to and in contact with the side walls thereof respectively, with a portion of said strip protruding from said groove and with one of the cut surfaces disposed below the bottom of the article forming a suction gripping surface.

SAMUEL LEWIS.